(12) United States Patent
Shah et al.

(10) Patent No.: US 8,769,012 B1
(45) Date of Patent: Jul. 1, 2014

(54) SYSTEM AND METHOD FOR FACILITATING DOCUMENT COLLABORATION

(75) Inventors: Chirag Shah, Sunnyvale, CA (US); Robert Russell, Mountain View, CA (US)

(73) Assignee: Google Inc., Mountain View, CA (US)

( * ) Notice: Subject to any disclaimer, the term of this patent is extended or adjusted under 35 U.S.C. 154(b) by 326 days.

(21) Appl. No.: 13/273,125

(22) Filed: Oct. 13, 2011

(51) Int. Cl.
*G06F 15/16* (2006.01)

(52) U.S. Cl.
USPC .......................................................... 709/204

(58) Field of Classification Search
USPC .................. 709/204, 205, 206, 217–219; 715/751–759; 707/608–611
See application file for complete search history.

(56) References Cited

U.S. PATENT DOCUMENTS

| | | | |
|---|---|---|---|
| 7,620,902 B2 | 11/2009 | Manion et al. | |
| 7,702,730 B2 * | 4/2010 | Spataro et al. | 709/205 |
| 2006/0259957 A1 * | 11/2006 | Tam et al. | 726/3 |
| 2010/0262550 A1 | 10/2010 | Burritt et al. | |
| 2011/0010332 A1 * | 1/2011 | Vasudevan et al. | 707/608 |

* cited by examiner

*Primary Examiner* — Ruolei Zong
(74) *Attorney, Agent, or Firm* — McDermott Will & Emery LLP (57) ABSTRACT

A system and machine-implemented method for facilitating collaboration with one or more users including receiving a request from a first user to collaborate with a social group on a collaboration object, the social group including one or more users associated with the first user at a social networking site, generating a post providing access to the collaboration object in response to receiving the request, providing the post for display at the social networking site, receiving a request to access the collaboration object from a second user in response to the second user interacting with the post at the social networking site and providing the collaboration object for display to the second user at the social networking site in response to receiving the request from the second user, wherein the second user is able to modify the collaboration object at the social networking site.

21 Claims, 4 Drawing Sheets

SYSTEM AND METHOD FOR FACILITATING DOCUMENT COLLABORATION

BACKGROUND

The subject disclosure generally relates to document collaboration, and, in particular, to collaborating on documents with contacts on social networking sites.

Currently, users of computer systems may create a document, and may invite others to collaborate to revise and finalize the document. For example, employees in an organization may collaborate with one another to finalize a design document. To facilitate such collaboration, the original author may individually enter a name and e-mail address for each desired collaborator. The desired collaborators are then able to access and modify the document. However, it is likely that the original author may not be aware of all individuals that may be desirable collaborators or may inadvertently leave out collaborators when sending a request to collaborate.

With the introduction of social networks and social groups (e.g., social circles) supported by social networks, it is now possible for a user to maintain groups of users according to common expertise, relationships, or other characteristics. These lists may be built over time, and thus, may provide a comprehensive collection of individuals having common characteristics. The lists are used at the social networking site for facilitating communication between the social networking site users.

A method facilitating document collaboration according to relationships defined within social networking sites is therefore desirable.

SUMMARY

The disclosed subject matter relates to a method for execution on one or more computing devices for facilitating collaboration with one or more contacts within a social group, the method comprising receiving a request from a first user to collaborate with a social group on a collaboration object, wherein the social group comprises one or more users associated with the first user at a social networking site. The method further comprising generating using the one or more computing devices a post providing access to the collaboration object in response to receiving the request from the first user. The method further comprising providing the post for display at the social networking site. The method further comprising receiving a request to access the collaboration object from a second user in response to the second user interacting with the post at the social networking site and providing the collaboration object for display to the second user at the social networking site in response to receiving the request from the second user, wherein the second user is able to modify the collaboration object at the social networking site.

The disclosed subject matter also relates to a system for facilitating collaboration with one or more contacts within a social group, the method comprising one or more processors and a machine-readable medium comprising instructions stored therein, which when executed by the processors, cause the processors to perform operations comprising receiving a request from a first user to collaborate with a social group on a collaboration object, wherein the social group comprises one or more users associated with the first user at a social networking site. The operations further comprising generating a post comprising a link to the collaboration object in response to receiving the request from the first user. The operations further comprising providing the post for display to the one or more users of the social group at the social networking site. The operations further comprising receiving an indication of a selection of the link at the social networking site by a second user and providing the collaboration object for display to the second user at the social networking site in response to receiving the indication of the selection, wherein the second user is able to modify the collaboration object at the social networking site.

The disclosed subject matter also relates to a machine-readable medium comprising instructions stored therein, which when executed by a machine, cause the machine to perform operations comprising receiving a request from a first user to collaborate with a social group on a collaboration object, wherein the social group comprises one or more users associated with the first user at a social networking site. The operations further comprising providing a post for display to the one or more users at the social networking site in response to receiving the request from the first user, the post providing access to the collaboration object. The operations further comprising receiving a request to access the document from a second user of the one or more users in response to the second user interacting with the post at the social networking site. The operations further comprising providing the document for display to the second user at the social networking site in response to receiving the request from the second user, wherein the second user is able to modify the document through the social networking site and generating an updated post for display at the social networking site in response to providing the document for display to the second user, wherein the updated post includes an identification of the second user.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

I. Overview

The subject disclosure provides a system for facilitating collaboration with one or more contacts (e.g., contacts within social groups). The system may leverage existing social graphs maintained at one or more social networking sites to facilitate distribution of posts with contacts of a user. For example, one or more social networking sites may maintain a social graph of users and their contacts. The system may access social graphs maintained at these social networking sites and retrieve contacts and social groups associated with the user. In one instance, the user may indicate membership at one or more social networking sites and provide the system with access to these social networking sites, for example, through a token. The contacts retrieved by the system may depend upon the specific privacy settings enforced at each of the social networking sites.

The system may access the social networking sites and retrieve "contact information" with respect to one or more users of the system including the user's associated contacts and social groups. Using the contact information, the system may then allow users of the system to select specific contacts or social groups and collaborate with selected contacts, including contacts within predefined social groups or individually selected contacts, on various collaboration objects (e.g., documents, files or other objects including multi-media content). The system may allow the user to choose specific contacts or groups of contacts with whom the collaboration object is shared. In one example, some or all of the social networking sites may provide support for selectively sharing the collaboration object (e.g., within a post) with one or more contacts of the users. For example, a post including a link to the collaboration object may be distributed to the one or more social networking sites to be displayed to the user's selected contacts at the social networking site.

In one example, the system may allow users of the system to collaborate with their contacts on various collaboration objects such as documents and files including text, videos, audio, images and other content. As used herein, the phrase "collaboration object" encompasses its plain and ordinary meaning, including but not limited to a collection of content and may include but is not limited to images, videos, audio, document and other digital files. The term "collaboration" encompasses its plain and ordinary meaning, including but not limited to, an activity in which one or more participants or services share information or points of view for the purpose of sharing knowledge or a decision regarding one or more collaboration objects and/or topics.

For example, a user of the system may generate a collaboration object and may share the collaboration object with individual contacts and/or selected social groups at one or more social networking sites. The system may generate a post providing access to the collaboration object (e.g., a link to the collaboration object) to be displayed to the selected contacts at the social networking site. As used herein, "posts" generally refer to any displayable notification or announcement regarding activities performed with respect to the collaboration object. The post may provide access to the collaboration object (e.g., through a link to the collaboration object) and allow the selected contacts to view and edit the collaboration object. The post may further be updated by the system as contacts access and modify the collaboration object.

Users of social networking sites may create associations with one another. The phrase "social networking site" as used herein encompasses its plain and ordinary meaning, including, but not limited to, an online service, platform or site that focuses on building and reflecting of social associations and interactions among users. These associations may be stored within a social graph at each social networking site (e.g., maintained at remote server(s) 120). Such user associations may be defined on a user-to-user basis, or as a group of users associated through membership within a group. As used herein, "contacts" refer to other users that a user is associated with, at one or more social networking sites.

A user may create "social groups" (e.g., social circles) including one or more contacts to organize his/her associations. The social groups may be additionally used to control distribution of messages and content to contacts of the user. For example, "social circles" are categories to which a user can assign their social networking contacts and better control the distribution and visibility of social networking messages as well as other multimedia content (e.g., documents, and other collaboration objects). In accordance with the subject disclosure, a social circle is provided as a data set defining a collection of contacts that are associated with one another. As used herein, a social circle can be described from the perspective of an individual that is the center of a particular collection of socially interconnected people, or from the aggregate perspective of a collection of socially interconnected people. In some examples, a social circle can have narrowly defined boundaries, all of the members of the social circle may be familiar with one another, and permission may be required for a member to join a social circle. In accordance with the subject disclosure, a user of an electronic device may define a social circle, and the social circle, as a data set defining a collection of contacts, may reflect a real-life social circle of the user.

For example, a user of an electronic device may have different groups of friends, coworkers, and family, and there may be some overlap among those groups (e.g., a coworker who is also considered to be a friend, a family member who is also a coworker). Through the creation and use of social groups (e.g., social circles), the user can organize and categorize his/her contacts into various different groupings.

II. Example Client-Server Network Environment for Facilitating Collaboration

Figure 1:
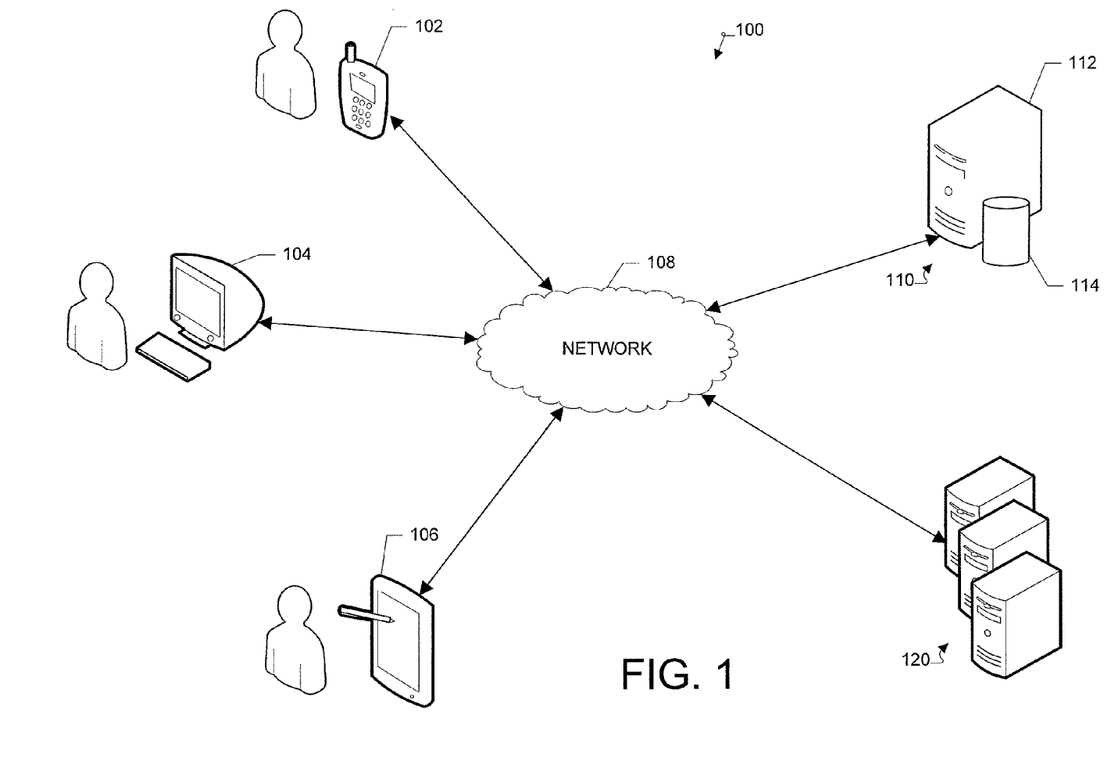
FIG. 1 illustrates an example client-server network environment, which provides for method for facilitating collaboration with one or more contacts at a social networking site.

FIG. 1 illustrates an example client-server network environment, which provides for method for facilitating collaboration with one or more contacts at a social networking site. A network environment 100 includes a number of electronic devices 102, 104 and 106 communicably connected to a server 110 and remote servers 120 by a network 108. Network 108 can be a public communication network (e.g., the Internet, cellular data network, dialup modems over a telephone network) or a private communications network (e.g., private LAN, leased lines). Further, network 108 can include, but is not limited to, any one or more of the following network topologies, including a bus network, a star network, a ring network, a mesh network, a star-bus network, a tree or hierarchical network, and the like.

In some example embodiments, electronic devices 102, 104 and 106 can be computing devices such as laptop or desktop computers, smartphones, PDAs, portable media players, tablet computers, televisions or other displays with one or more processors coupled thereto or embedded therein, or other appropriate computing devices. In the example of FIG. 1, electronic device 102 is depicted as a smartphone, electronic device 104 is depicted as a desktop computer and electronic device 106 is depicted as a PDA.

In one embodiment, server 110 includes a processing device 112 and a data store 114. Processing device 112 executes computer instructions stored in data store 114, for example, to facilitate collaboration between users interacting with electronic devices 102, 104 and 106. Server 110 may further be in communication with remote servers 120 either through the network 108 or through another network or communication means.

According to some aspects, remote servers 120 can be any system or device having a processor, a memory and communications capability for hosting various social networking sites. In one embodiment, remote servers 120 may be further capable of maintaining social graphs of users and their contacts. The social networking sites hosted on the remote server 120 may enable users to create a profile and associate themselves with other users at a social networking site. The remote servers 120 may further facilitate the generation and maintenance of a social graph including the user created associations. The social graphs may include, for example, a list of all users of the social networking site and their associations with other users of a social networking site. Additionally, the remote server 120 may facilitate organizing contacts into one or more social groups (e.g., social circles).

In some example aspects, server 110 and/or one or more remote servers 120 can be a single computing device such as a computer server. In other embodiments, server 110 and/or one or more remote servers 120 can represent more than one computing device working together to perform the actions of a server computer (e.g., cloud computing). In some embodiments, server 110 and/or one or more remote servers 120 may be coupled with various remote databases or storage services. Communications between the client devices 102, 104 and 106, server 110 and/or one or more remote servers 120 may be facilitated through the HTTP communication protocol. Other communication protocols may also be facilitated including for example, XMPP communication, for some or all communications between the client devices 102, 104 and 106, server 110 and one or more remote servers 120.

Users may interact with the system hosted by server 110, and/or the one or more social networking sites hosted by remote servers 120, through a client application installed at the electronic devices 102, 104 and 106. Alternatively, users may interact with the system and/or the one or more social networking sites through a web based browser application at the electronic devices 102, 104 and 106. Communication between client devices 102, 104 and 106 and the system, and/or the one or more social networking sites, may be facilitated through a network (e.g., network 108).

In one embodiment, users may interact with the system hosted at the server 110, to create a collaboration object (e.g., a document) and select contacts or social groups (e.g., social circles) for collaboration. Users operating electronic devices 102, 104 and 106 can create a collaboration object (e.g., a document) at a first application (e.g., a document editing application) and share the collaboration object with one or more selected contacts at one or more social networking sites.

Upon receiving a user request from a user at a client device (e.g., electronic devices 102, 104 and 106), the client device may initiate communication with the system and send a data set including login information of the user. The data set can be transmitted from the user's client device (e.g., electronic devices 102, 104 and 106) and received at server 110 hosting the system, for user authentication. Once the user is authenticated and access is granted to the user, the system may retrieve and send a data set to the user's client device, for displaying a graphical user interface at the client device operated by the user (e.g., electronic devices 102, 104 and 106).

The system may further send a query to the user's client device (e.g., displayed within the graphical user interface displayed at the client device) for information regarding one or more social networking sites the user is associated with. Upon receiving a response from the user's client device (e.g., in response to a selection by the user operating the device) the system may initiate establishing communication with one or more social networking sites (e.g., through network 108 and remote servers 120). For example, the system may cause the client device to reroute the user to the social networking site. The user's client device may then communicate with the social networking site and send login information to the social networking site, for example by sending a data set including the login information. The social networking site may authenticate the user using the received data set and may provide the user's client device with a token (e.g., a temporary token). The system hosted at server 110 may then retrieve the token from the user's client device, and may establish communication with one or more servers 120 hosting the social networking site using the token. For example, the communication may be facilitated using API calls. Similar steps may be performed for each of the one or more social networking sites associated with the user operating the client device.

Upon being granted access to each of the one or more social networking sites (e.g., through one or more remote servers 120), the system may then issue a request to each social networking site associated with the user to retrieve all contacts and social groups of the user maintained at the social networking site. In one embodiment, for example, the system (e.g., through server 110) may issue an API call sent to the social networking site (e.g., sent from server 100 to one or more remote servers 120 through network 108). In one aspect, a social networking site hosted by one or more remote servers 120, may maintain contact information regarding contacts and any grouping of contacts for each of its members, including the user. The one or more remote servers 120 may access the remote storage and retrieve such contact information. The social networking site may access the social graph and may retrieve the contacts of the user. The social networking site may further retrieve information associated with each contact or the association of the user with the contact, such as groupings of contacts and privacy preferences.

The one or more remote servers 120 hosting the social networking site may provide the system (e.g., through server 110) with data sets including the contacts of the user and names of social groups associated with the user, and may do so based upon contact information such as the privacy preferences. The server 110, upon receiving the contact information from one or more social networking sites, may store the data set including the contact information for each user (e.g., within the belonging profile of the belonging) at the server 110 (e.g., at storage 114). In one aspect, the contact information maintained at the server 110 may be updated periodically, by issuing a request to the one or more social networking sites (e.g., through one or more remote servers 120) and receiving updated data sets including user contact information.

In one example, the system may allow users of the system to collaborate with their contacts on various collaboration objects including documents and files including text, videos, audio, images and other multi-media content that the user may wish to collaborate on with other users. For example, a user of the system may generate a collaboration object and may share the collaboration object with selected social networking contact or groups. The system allows a first user of the system to create a collaboration object (e.g., a document), and select one or more social groups associated with one or more social networking sites for collaboration. The system may provide the user's client device with a graphical user interface including the contacts and/or social groups of the user. The user may interact with the graphical user interface provided by the system and displayed at the user's client device to select one or more contacts or social groups and share the collaboration object with the selected contacts.

Upon receiving a request from the user to collaborate with the selected contacts, the system may generate a post and provide the post to be displayed at the social networking site(s) to the selected contacts (e.g., contacts belonging to the selected social group(s) or specified individually). The generated post may provide a notification that the first user is requesting collaboration with regard to the collaboration object (e.g., a document). The post may also include a link to the collaboration object providing the selected contacts with access to the collaboration object.

The system may transmit a request to display the post to the selected contacts (e.g., contacts within a selected social group specified by the user or contacts individually specified by the user) at the social networking site. For example, the system may issue an API call to the social networking site for displaying the post. The post may be formatted to include a notification message (e.g., a text string) and a link to the collaboration object (e.g., embedded within the text string or separately presented).

The social networking site may receive the post and may display the post to the selected contacts (e.g., within the stream of the selected contacts). The post may only be visible to the selected contacts. The displayed post may indicate a list of the selected contacts that have access to the collaboration object. Upon viewing the post, the selected contacts (e.g., contacts within the selected social group(s) or contacts specified individually), may select to view the collaboration object (e.g., a document). For example, a selected contact may select the link to the collaboration object provided with the post.

Once a contact of the user selects to view the collaboration object (e.g., by clicking on the link provided within the post), the system receives the request and may determine whether the selected contact is authorized to access the collaboration object. The social networking site may only display the post to selected contacts specified by the user (e.g., either individually or as part of a social group). Thus, the system may automatically grant access to the collaboration object when a selected contact clicks on the link. Alternatively, the collaboration object may be associated with an Access Control List (ACL) and the system may determine whether the contact requesting to access the collaboration object has permission according to the ACL. For example, where the ACL includes one or more social groups, the system may determine whether the contact is one of the one or more contacts associated with one of the one or more social groups.

The system may provide the collaboration object for display to the contact and the graphical user interface at the client device of the contact may be updated to display the collaboration object. For example, the collaboration object may be displayed to the contact as an overlay (e.g., within a LIGHT-BOX window or an inline frame) at the graphical user interface displaying the post at the social networking site. The system may launch an instance of an application facilitating for viewing and editing the collaboration object and provide the collaboration object for display within the instance of the launched application. The contact may view and edit the collaboration object within overlay of the graphical user interface displaying the social networking site. Thus, the contact does not need to be re-routed to the collaboration object editing application in order to make modifications to the collaboration object.

In addition, once the system receives the user request to view the collaboration object and provides the collaboration object for display to the contact, the system may modify the post displayed to the selected contacts (e.g., within the stream of each of the selected contacts) to further display the name of the contact viewing the collaboration object. Accordingly, in addition to notifying selected contacts that a collaboration object is available for collaboration, the updated post further notifies the selected contacts that one or more other users (i.e. contacts of the original author) are currently or have at some time viewed or modified the collaboration object. For example, the updated post may be formatted to include a notification message (e.g., a text string similar to the original message), a link to the collaboration object (or modified collaboration object) and a listing of the contacts who have viewed the collaboration object (e.g., a name, picture, and/or a link to the profile of the contacts).

Contacts of the user may view and edit the collaboration object simultaneously. Upon receiving a modification of the collaboration object by a user (e.g., the original author or selected contacts), the system updates the collaboration object to reflect the modifications. The system may also modify the post to provide access (e.g., a link) to the updated collaboration object such that users accessing the collaboration object will be able to view the modifications by other users. Alternatively, the existing link may be associated with the modified collaboration object such that when users click on the link they will be provided with the updated collaboration object. Thus, a more efficient system for providing collaboration is provided to a user of the system.

III. Example Processes for Facilitating Collaboration

Figure 2:
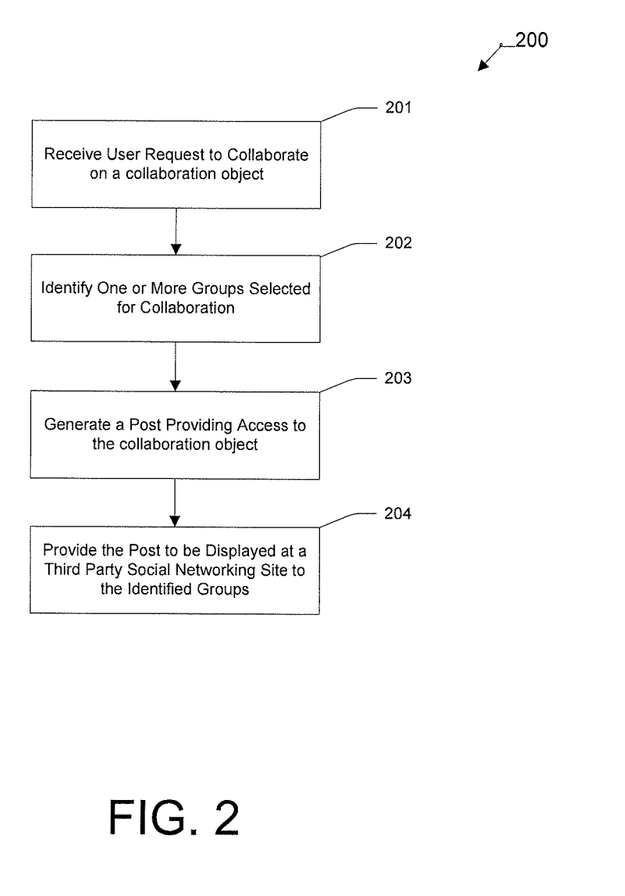
FIG. 2 illustrates a flow chart of a process for facilitating sharing of a collaboration object with selected social groups for the purpose of collaboration.

FIG. 2 illustrates a flow chart of a process 200 for facilitating sharing of a collaboration object with selected social groups for the purpose of collaboration. In step 201, the system receives a request from a user to collaborate on a collaboration object. For example, a user may generate a collaboration object (e.g., document, video stream), and may request to share the collaboration object with one or more users for collaboration. In response to receiving the user request, the system may retrieve a listing of available contacts and social groups of the user and may provide a listing of the available contacts and/or social groups with whom that the user may share the collaboration object.

In step 202, the system identifies one or more social groups selected for collaboration. For example, the system may receive a user listing of one or more contacts and/or social groups with whom the user wishes to share the collaboration object. The system may further detect one or more other individual contacts selected for collaboration instead of or in addition to social groups. Next, in step 203, the system generates a post providing access to the collaboration object. For example, the system generates a link to the collaboration object, and creates a post including the link. The post may further include a text string notifying selected contacts (e.g., members of the selected social groups), that the user wishes to collaborate with users on a collaboration object (e.g., document).

In step 204, the post may be provided to the social networking site (e.g., transmitted to remote server 120 through network 108), for display to the selected contacts (e.g., members of the selected social groups). For example, the post may be sent to the social networking site along with an API call to the social networking site. The social networking site may receive the post and display the post to the selected contacts. In one example, the system further provides a listing of contacts and/or social groups identified in step 202 to the social networking site. The social networking site identifies the selected contacts (e.g., based on the identified social groups) and displays the post to those contacts. For example, the post may be displayed on the stream for the selected contacts and/or the user requesting the collaboration.

Figure 3:
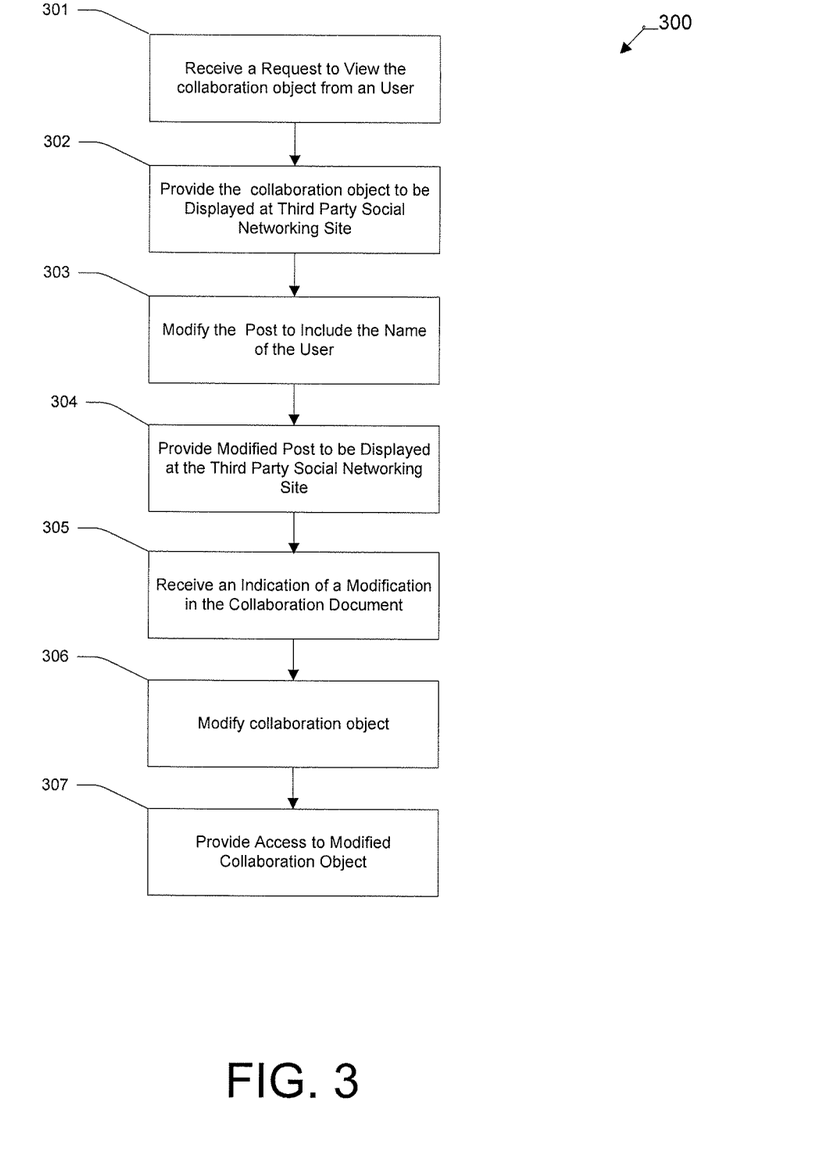
FIG. 3 illustrates a flow chart of a process for facilitating collaboration at a social networking site.

FIG. 3 illustrates a flow chart of a process for facilitating collaboration at a social networking site. In step 301, the system receives a request from a user to view a collaboration object (e.g., a document). The system may for example receive the request to view the collaboration object when a user (e.g., the original author or one of his/her contacts) viewing the post associated with the collaboration object, selects the link to the collaboration object provided within the post.

Upon receiving the request, the system may determine whether the user is authorized to access the collaboration object. The post may only be displayed to selected contacts specified by the user (e.g., either individually or as part of a social group). Thus, the system may automatically grant access to the collaboration object when request is received in response to receiving an indication of a selection of the link. Alternatively, the collaboration object may be associated with an Access Control List (ACL) and the system may determine whether the user requesting to access the collaboration object has permission according to the ACL. For example, where the ACL includes one or more social groups, the system may determine whether the user is one of the one or more contacts associated with one of the one or more social groups at the time the request to access the collaboration object is received (i.e., a member of one of the one or more social groups).

In step 302, the system retrieves the collaboration object and provides the collaboration object for display at the social networking site. The collaboration object may be displayed to the user requesting to view the collaboration object as an overlay (e.g., within a LIGHTBOX window or an inline frame) at the social networking site. The overlay may provide an instance of an application providing for viewing and editing the collaboration object. In step 303, in response to receiving the request to view the collaboration object, the system may modify the post displayed to the selected contacts (e.g., contacts the user has shared the collaboration object with at the social networking site) to further identify the user requesting to view the collaboration object.

In step 304, the updated post is provided for display to the user at the social networking site. In one aspect, the social networking site may receive the updated post and replace the original post with the updated post. The updated post may be displayed to all of the selected contacts. In addition to notifying selected contacts that a collaboration object is available for collaboration, the updated post further notifies the selected contacts that one or more other users (i.e. contacts of the original author) are currently or have viewed or modified the collaboration object. For example, the updated post may be formatted to include a notification message (e.g., a text string similar to the original message), a link to the collaboration object (or modified collaboration object) and a listing of the contacts who have viewed the collaboration object (e.g., a name, picture, and/or a link to the profile of the user).

In step 305, the system receives an indication of a modification to the collaboration object. For example, the user viewing the collaboration object may edit the collaboration object and the system may receive an indication of the user input. Upon receiving a modification of the collaboration object by a user (e.g., the original author or selected contacts), the system updates the collaboration object to reflect the modifications. Additionally, upon detecting a modification of the collaboration object the system may generate a notification for display to one or more users (e.g., at the social networking site) notifying the users that the collaboration object has been modified. The notification may be displayed to all users with whom the original post was shared (i.e., the selected contacts). Alternatively, the notification may only be displayed to the original user requesting collaboration and/or users who have previously viewed and/or modified or are currently viewing and/or modifying the collaboration object. The notification level may be specified by the original author or by one or more of the selected contacts.

In step 307, the system provides the selected contacts with access to the updated collaboration object. For example, the system may modify the post displayed at the social networking site to provide access (e.g., a new link) to the updated collaboration object such that users accessing the collaboration object will be able to view the modifications by other users. Alternatively, the existing link may be associated with the modified collaboration object such that when users click on the link they will be provided with the updated collaboration object.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

IV. Example System for Facilitating Collaboration

Figure 4:
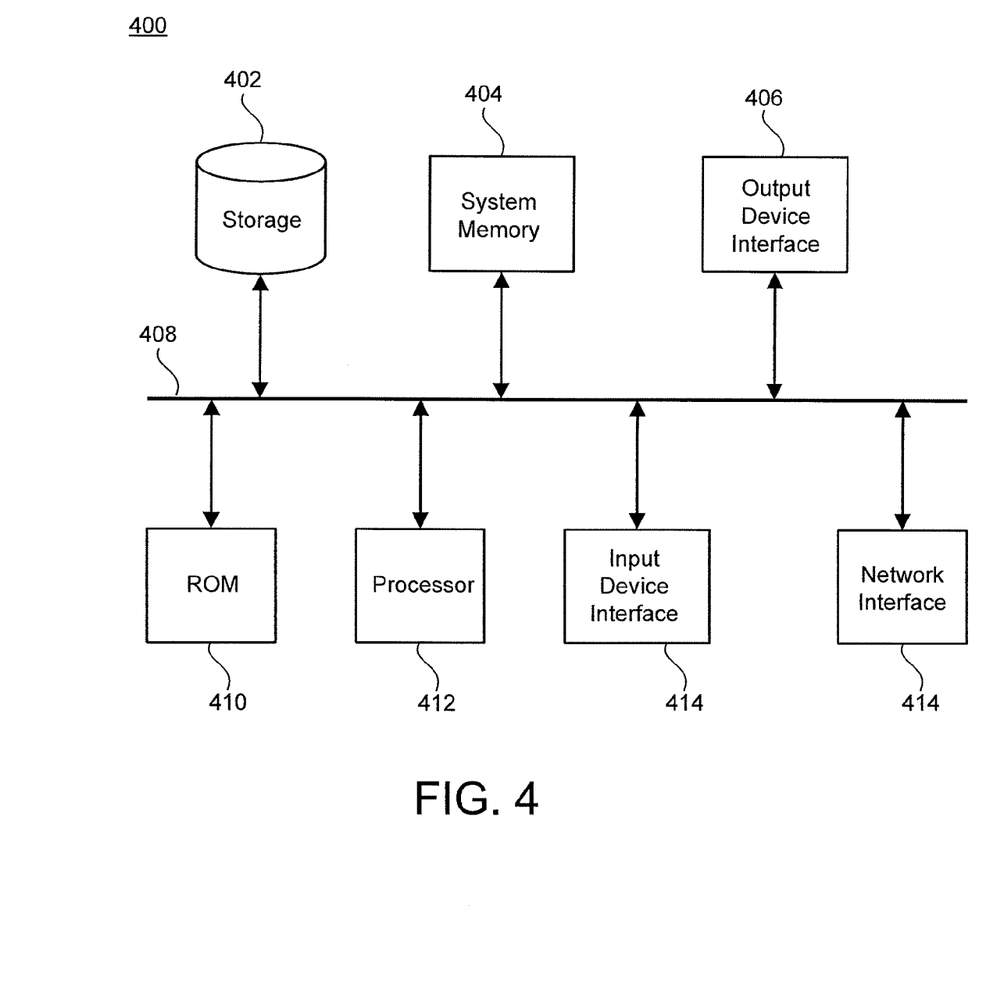
FIG. 4 conceptually illustrates an electronic system with which some implementations of the subject technology are implemented.

FIG. 4 conceptually illustrates an electronic system with which some implementations of the subject technology are implemented. Electronic system 400 can be a server, computer, phone, PDA, or any other sort of electronic device. Such an electronic system includes various types of computer readable media and interfaces for various other types of computer readable media. Electronic system 400 includes a bus 408, processing unit(s) 412, a system memory 404, a read-only memory (ROM) 410, a permanent storage device 402, an input device interface 414, an output device interface 406, and a network interface 416.

Bus 408 collectively represents all system, peripheral, and chipset buses that communicatively connect the numerous internal devices of electronic system 400. For instance, bus 408 communicatively connects processing unit(s) 412 with ROM 410, system memory 404, and permanent storage device 402.

From these various memory units, processing unit(s) 412 retrieves instructions to execute and data to process in order to execute the processes of the subject disclosure. The processing unit(s) can be a single processor or a multi-core processor in different implementations.

ROM 410 stores static data and instructions that are needed by processing unit(s) 412 and other modules of the electronic system. Permanent storage device 402, on the other hand, is a read-and-write memory device. This device is a non-volatile memory unit that stores instructions and data even when electronic system 400 is off. Some implementations of the subject disclosure use a mass-storage device (such as a magnetic or optical disk and its corresponding disk drive) as permanent storage device 402.

Other implementations use a removable storage device (such as a floppy disk, flash drive, and its corresponding disk drive) as permanent storage device 402. Like permanent storage device 402, system memory 404 is a read-and-write memory device. However, unlike storage device 402, system memory 404 is a volatile read-and-write memory, such a random access memory. System memory 404 stores some of the instructions and data that the processor needs at runtime. In some implementations, the processes of the subject disclosure are stored in system memory 404, permanent storage device 402, and/or ROM 410. For example, the various memory units include instructions for facilitating collaboration in accordance with some implementations. From these various memory units, processing unit(s) 412 retrieves instructions to execute and data to process in order to execute the processes of some implementations.

Bus 408 also connects to input and output device interfaces 414 and 406. Input device interface 414 enables the user to communicate information and select commands to the electronic system. Input devices used with input device interface 414 include, for example, alphanumeric keyboards and pointing devices (also called "cursor control devices"). Output device interfaces 406 enables, for example, the display of images generated by the electronic system 400. Output devices used with output device interface 406 include, for example, printers and display devices, such as cathode ray tubes (CRT) or liquid crystal displays (LCD). Some implementations include devices such as a touchscreen that functions as both input and output devices.

Finally, as shown in FIG. 4, bus 408 also couples electronic system 400 to a network (not shown) through a network interface 416. In this manner, the computer can be a part of a network of computers (such as a local area network ("LAN"), a wide area network ("WAN"), or an Intranet, or a network of networks, such as the Internet. Any or all components of electronic system 400 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system may be interconnected by any form or medium of digital data communication, e.g., a communication network. While several components or steps are described as being performed by the system, it should be understood that various components and steps may be performed by different systems in communication with one another, e.g., through a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for execution on one or more computing devices for facilitating collaboration with one or more contacts within a social group, the method comprising:
   receiving a request from a first user to collaborate with a social group on a collaboration object, wherein the social group comprises one or more users associated with the first user at a social networking site;
   generating using the one or more computing devices a post providing access to the collaboration object in response to receiving the request from the first user, the post including a link to the collaboration object;
   providing the post for display at the social networking site, wherein the post is provided for display within a social stream of one or more users of the social networking site, wherein the social stream of the one or more users of the social networking site displays a plurality of posts including the post;
   receiving a request to access the collaboration object from a second user at the social networking site in response to the second user interacting with the post at the social networking site, wherein the interacting comprises the second user selecting the link included in the post;
   providing the collaboration object for display to the second user at the social networking site in response to receiving the request from the second user, wherein the collaboration object is provided as an overlay window at the social networking site, wherein the second user is able to modify the collaboration object at the social networking site;
   detecting a modification to the collaboration object by the second user at the social networking site; and
   providing a notification to a set of users in response to detecting the notification, the set of users including one or more of the first user, one or more users who viewed the collaboration object or one or more users who modified the collaboration object, the notification indicating that the collaboration object has been modified.

2. The method of claim 1, further comprising:
   generating using the one or more computing devices an updated post in response to detecting the request from the second user, wherein the updated post provides access to the collaboration object and includes an identification of the second user.

3. The method of claim 2, further comprising:
providing the updated post for display to the one or more users at the social networking site.

4. The method of claim 3, further comprising:
sending a request to the social networking site, the request causing the social networking site to replace the post with the updated post at the social networking site.

5. The method of claim 1, further comprising:
modifying, using the one or more computing devices, the collaboration object based on the detection of the modification at the social networking site to generate a modified collaboration object, the modified collaboration object reflecting the modification;
providing the one or more users associated with the social group with access to the modified collaboration object at the social networking site.

6. The method of claim 5, wherein providing the one or more users with access to the modified collaboration object comprises:
generating using the one or more computing devices an updated post in response to detecting the modification, wherein the updated post provides access to the modified collaboration object.

7. The method of claim 6, further comprising:
providing the updated post to be displayed to the social group at the social networking site.

8. The method of claim 5, wherein updating the post comprises updating the link to the collaboration object to provide access to the modified collaboration object.

9. The method of claim 1, further comprising:
providing the notification for display at the social networking site.

10. The method of claim 1, wherein the second user can view and modify the collaboration object directly from the overlay window.

11. The method of claim 1, wherein the collaboration object comprises a document.

12. The method of claim 1, further comprising:
determining whether the second user is authorized to access the collaboration object in response to receiving the request from the second user;
wherein providing the collaboration object for display comprises providing the collaboration object for display if it is determined that the second user is authorized to access the collaboration object.

13. The method of claim 12, wherein determining whether the second user is authorized to the access the collaboration object comprises determining whether the second user is one of the one or more users associated with the social group.

14. The method of claim 1, wherein providing the post for display comprises providing the post for display to the one or more users associated with the social group.

15. The method of claim 1, wherein the post further includes a text string notifying the one or more users that the first user is requesting to collaborate with the users regarding the collaboration object.

16. A system for facilitating collaboration with one or more contacts within a social group, the system comprising:
one or more processors; and
a machine-readable medium comprising instructions stored therein, which when executed by the processors, cause the processors to perform operations comprising:
receiving a request from a first user to collaborate with a social group on a collaboration object, wherein the social group comprises one or more users associated with the first user at a social networking site;
generating a post comprising a link to the collaboration object in response to receiving the request from the first user;
providing the post for display to the one or more users of the social group at the social networking site, wherein the post is provided for display within a social stream of the one or more users of the social group, and wherein the social stream of the one or more users of the social group displays a plurality of posts including the post;
receiving an indication of a selection of the link at the social networking site by a second user;
providing the collaboration object for display to the second user as an overlay window at the social networking site in response to receiving the indication of the selection, wherein the second user is able to modify the collaboration object at the social networking site;
detecting a modification to the collaboration object by the second user at the social networking site; and
providing a notification to a set of users in response to detecting the notification, the set of users including one or more of the first user, one or more users who viewed the collaboration object or one or more users who modified the collaboration object, the notification indicating that the collaboration object has been modified.

17. The system of claim 16, the operations further comprising:
modifying the collaboration object based on the detection of the modification at the social networking site to generate a modified collaboration object, the modified collaboration object reflecting the modification; and
providing the one or more users associated with the social group with access to the modified collaboration object at the social networking site.

18. The system of claim 16, the operations further comprising:
generating an updated post in response to receiving the request from the second user, wherein the updated post provides access to the collaboration object and includes an identification of the second user; and
providing the updated post for display to the one or more users.

19. A non-transitory machine-readable medium comprising instructions stored therein, which when executed by a machine, cause the machine to perform operations comprising:
receiving a request from a first user to collaborate with a social group on a collaboration object, wherein the social group comprises one or more users associated with the first user at a social networking site;
providing a post including a link to the collaboration object for display to the one or more users at the social networking site in response to receiving the request from the first user, the post providing access to the collaboration object, wherein the post is provided for display within a social stream of one or more users of the social networking site, wherein the social stream of the one or more users of the social networking site displays a plurality of posts including the post;
receiving a request to access the collaboration object from a second user of the one or more users in response to the second user interacting with the post at the social networking site, wherein the interaction comprises the second user selecting the link;

providing the collaboration object for display to the second user at the social networking site in response to receiving the request from the second user, wherein the second user is able to modify the collaboration object through the social networking site; and generating an updated post for display at the social networking site in response to providing the collaboration object for display to the second user, wherein the updated post includes an identification of the second user, wherein the collaboration object is provided as an overlay window at the social networking site;

detecting a modification to the collaboration object by the second user at the social networking site; and providing a notification to a set of users in response to detecting the notification, the set of users including one or more of the first user, one or more users who viewed the collaboration object or one or more users who modified the collaboration object, the notification indicating that the collaboration object has been modified.

20. The machine-readable medium of claim 19, the operations further comprising:

generating a modified collaboration object based on the detection of a modification to the collaboration object by the second user, the modified collaboration object reflecting the modification; and generating a second updated post providing access to the modified collaboration object and including an identification of the second user; and providing the second updated post for display to the one or more users.

21. The machine-readable medium of claim 19, the operations further comprising:

sending a request to the social networking site, the request causing the social networking site to replace the post with the updated post within the social stream of the one or more users of the social group at the social networking site.

* * * * *